(12) United States Patent
Sun et al.

(10) Patent No.: US 8,669,857 B2
(45) Date of Patent: Mar. 11, 2014

(54) HAND-HELD DEVICE INTEGRATION FOR AUTOMOBILE SAFETY

(75) Inventors: Bo Sun, Novi, MI (US); Hisanori Miura, West Bloomfield, MI (US); Hiroshi Hattori, Bloomfield Hills, MI (US)

(73) Assignee: DENSO International America, Inc., Southfield, MI (US)

( * ) Notice: Subject to any disclaimer, the term of this patent is extended or adjusted under 35 U.S.C. 154(b) by 438 days.

(21) Appl. No.: 12/974,323

(22) Filed: Dec. 21, 2010

(65) Prior Publication Data

US 2011/0169626 A1 Jul. 14, 2011

Related U.S. Application Data

(60) Provisional application No. 61/294,563, filed on Jan. 13, 2010.

(51) Int. Cl.
*B60Q 1/00* (2006.01)

(52) U.S. Cl.
USPC .......... 340/438; 340/425.5; 340/435

(58) Field of Classification Search
USPC .......... 340/435
See application file for complete search history.

(56) References Cited

U.S. PATENT DOCUMENTS

| | | | |
|---|---|---|---|
| 7,908,060 B2 * | 3/2011 | Basson et al. | 701/45 |
| 2006/0103513 A1 * | 5/2006 | Ihara et al. | 340/435 |
| 2006/0255966 A1 | 11/2006 | McKenna | |
| 2007/0222617 A1 * | 9/2007 | Chai et al. | 340/573.1 |
| 2009/0258642 A1 * | 10/2009 | Golenski | 455/426.1 |
| 2009/0259349 A1 | 10/2009 | Golenski | |

FOREIGN PATENT DOCUMENTS

| | | |
|---|---|---|
| JP | 2007-249478 | 9/2007 |
| JP | 2008-094228 | 4/2008 |

* cited by examiner

*Primary Examiner* — Kerri McNally
(74) *Attorney, Agent, or Firm* — Harness, Dickey & Pierce, P.L.C.

(57) ABSTRACT

A system for aiding a user when travelling in a vehicle with a portable, handheld electronic device includes a sensor that detects an object outside the vehicle and that detects a condition regarding movement of the vehicle with respect to the object outside the vehicle. The sensor is supported in the vehicle for travel with the vehicle. The system also includes a communication system that allows the vehicle and the electronic device to communicate a signal therebetween. The signal relates to the condition detected by the sensor. Furthermore, the system includes an output device included on at least one of the vehicle and the electronic device. The output device is operable to output an alarm based on the signal communicated between the vehicle and the electronic device.

11 Claims, 2 Drawing Sheets

HAND-HELD DEVICE INTEGRATION FOR AUTOMOBILE SAFETY

CROSS-REFERENCE TO RELATED APPLICATIONS

This application claims the benefit of U.S. Provisional Application No. 61/294,563, filed on Jan. 13, 2010. The entire disclosure of the above application is incorporated herein by reference.

FIELD

The present disclosure relates to a handheld electronic device used inside a vehicle to alert a driver to conditions outside of the vehicle.

BACKGROUND

This section provides background information related to the present disclosure which is not necessarily prior art. Most drivers of a vehicle, such as an automobile or a truck, carry a handheld electronic device, such as a cell phone, personal data assistant ("PDA"), pager, electronic tablet, wireless-network-connected portable device, or similar device into the vehicle when driving. Because these handheld devices are used to make phone calls, receive phone calls, send text messages, receive text messages, etc. vehicle drivers may be using such devices while driving a vehicle.

Also, modern vehicles are typically equipped with a variety of on-board systems to inform and alert drivers of conditions around an exterior of the vehicle. Driver information and alert systems can communicate to drivers through a display on a dashboard of the vehicle. In some instances sounds are used. While such on-board systems have been satisfactory for their given purposes, room for improvement exists. What is needed then is for hardware, software, and a method of operation to permit portable, handheld devices to interact with vehicle on-board systems.

SUMMARY

A system for aiding a user when travelling in a vehicle with a portable, handheld electronic device is disclosed. The system includes a sensor that detects an object outside the vehicle and that detects a condition regarding movement of the vehicle with respect to the object outside the vehicle. The sensor is supported in the vehicle for travel with the vehicle. The system also includes a communication system that allows the vehicle and the electronic device to communicate a signal therebetween. The signal relates to the condition detected by the sensor. Furthermore, the system includes an output device included on at least one of the vehicle and the electronic device. The output device is operable to output an alarm based on the signal communicated between the vehicle and the electronic device.

A method of aiding a user when travelling in a vehicle with a portable, handheld electronic device is also disclosed. The method includes detecting with a sensor, an object outside the vehicle, and further detecting with the sensor, a condition regarding movement of the vehicle with respect to the object outside the vehicle. The sensor is supported in the vehicle for travel with the vehicle. The method additionally includes communicating a signal between the vehicle and the electronic device, wherein the signal relates to the condition detected by the sensor. Additionally, the method includes outputting an alarm from an output device included on at least one of the vehicle and the electronic device. The alarm is based on the signal communicated between the vehicle and the electronic device.

A system for notifying a driver of a condition of a vehicle when travelling in the vehicle with a portable, handheld electronic device should the user become distracted by the electronic device is additionally disclosed. The system includes a sensor that detects an object outside the vehicle and that detects a plurality of conditions regarding movement of the vehicle with respect to the object. The sensor is supported in the vehicle for travel with the vehicle. The plurality of conditions include a lane shift by the vehicle and movement of the vehicle toward an obstacle. The system also includes a communications system that allows the vehicle and the electronic device to wirelessly communicate a signal therebetween, wherein the signal relates to the condition detected by the sensor. Furthermore, the system includes an output device included on one of the electronic device and the vehicle. The output device is operable to output at least one of a visual alarm, an audible alarm, and a tactile alarm based on the signal communicated between the vehicle and the electronic device to thereby alert the driver and cause the driver to refocus attention on driving the vehicle.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DESCRIPTION

Figure 1:
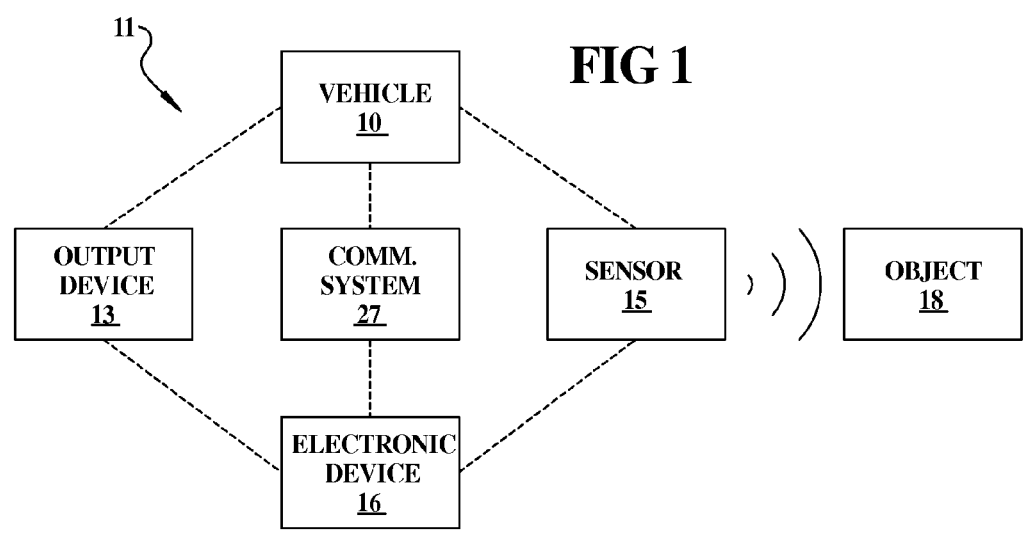
FIG. 1 is a schematic view of a system for aiding a user when travelling in a vehicle with a portable, handheld electronic device.

Example embodiments will now be described more fully with reference to the accompanying drawings. Referring initially to FIG. 1, a system 11 is schematically depicted for aiding a user (e.g., a driver) when travelling in a vehicle 10 with a portable, handheld electronic device 16. As will be discussed, the system 11 allows the vehicle 10 and the electronic device 16 to communicate with each other. Also, the system 11 can notify a user of a condition of the vehicle 10 via a speaker, display, etc. electronic device 16. Moreover, the system 11 can notify the user of the condition of the vehicle 10 via a speaker, display, etc. of the vehicle 10. For instance, if the driver's attention becomes too focused on the electronic device 16 instead of driving the vehicle, an alarm can be automatically output to cause the driver to re-focus attention back on driving the vehicle 10. The alarm can be output during a variety of predetermined scenarios and conditions of the vehicle 10 (e.g., the vehicle 10 is inadvertently shifting traffic lanes, the vehicle 10 is approaching an obstacle, or the speed limit changes). Accordingly, the system 11 can be very beneficial for the user.

Generally, the system 11 can include the vehicle 10 and the electronic device 16. The vehicle 10 can be of any suitable type, such as a car, truck, van, etc. Also, the electronic device 16 can be any suitable portable, handheld device 16 that can be carried to and from the vehicle 10. For instance, the electronic device 16 can be a cell phone, a personal data assistant ("PDA"), a pager, an electronic tablet, and/or a wireless-network-connected portable device.

The system 11 can also include an output device 13 that is operable to output an alarm. The output device 13 can be of any suitable type, such as a visual output device (e.g., a screen or other display) that outputs a visual alarm. The output device 13 can also be an audible output device (e.g., a speaker) that outputs an audible alarm. Moreover, the output device 13 can be a tactile output device (e.g., a vibrating motor) that outputs a tactile alarm. As will be discussed, the output device 13 can be included on and mounted to either the vehicle 10 or the electronic device 16.

Moreover, the system 11 can include a sensor 15. The sensor 15 can be of any suitable type, such as a camera, a radar system, etc. The sensor 15 can be supported in the vehicle 10 for travel with the vehicle 10. As such, the sensor 15 can be included on and mounted directly to the vehicle 10 and/or the electronic device 16. The sensor 15 is operable to detect an object 18 outside the vehicle 10. For instance, the sensor 15 can detect a traffic lane marker (e.g., a line applied to the roadway indicating the traffic lane), an obstacle of the vehicle 10 (e.g., another vehicle, a curb, a person, etc.), a speed limit sign, a stop sign, another sign, or any other object 18. The sensor can further detect a condition regarding movement of the vehicle 10 with respect to the object 18. For instance, the sensor 15 can detect that the vehicle 10 is approaching an obstacle, that the vehicle 10 is shifting lanes, that the vehicle 10 is entering a different speed zone, etc.

Additionally, the system 11 can include a communication system 27 that allows the vehicle 10 and the electronic device 16 to communicate one or more signals therebetween. The signal(s) can relate to the condition(s) detected by the sensor 15. In some embodiments, the communication system 27 allows for wireless communication; however, in some embodiments, the communication system 27 can allow for wired communication. In the latter case, the electronic device 16 can be temporarily and removably connected to the vehicle 10 by one or more wires.

Figure 2:
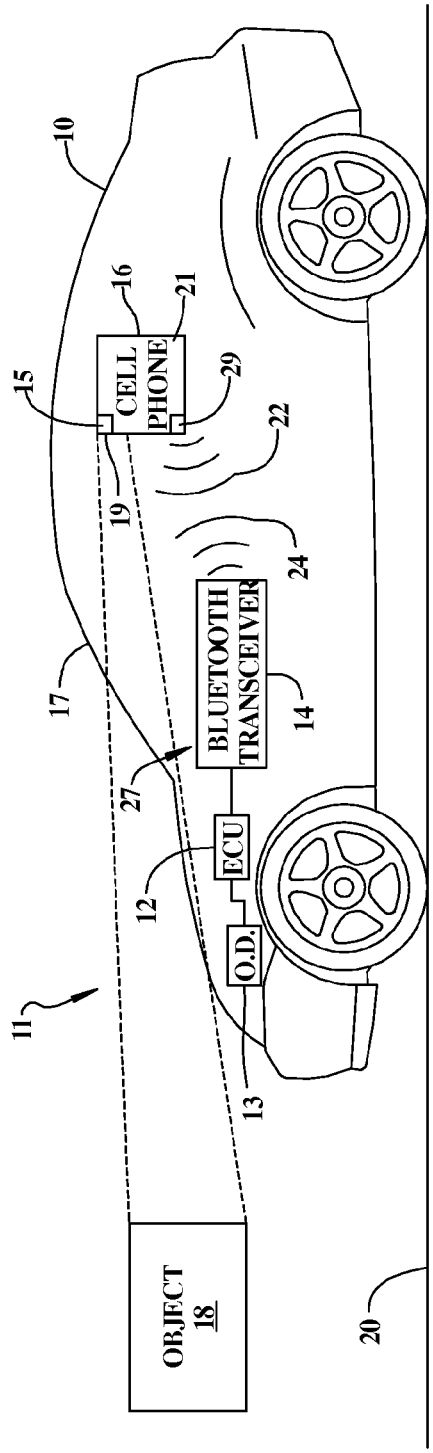
FIG. 2 is a schematic view of a vehicle and a handheld device within the vehicle that detects an object outside of the vehicle using the system of FIG. 1.

Referring now to FIG. 2, various exemplary embodiments of the system 11 will be discussed in greater detail. Generally, in the embodiments of FIG. 2, the sensor 15 is included on the electronic device 16, the output device 13 is included on the vehicle 10, and signals are transmitted from the electronic device 16 to the vehicle 10 such that the output device 13 outputs an alarm to the user. Also, in some embodiments represented in FIG. 2, an output device 13 can be included on the electronic device 16 so that the electronic device 16 can output the alarm to the user.

The vehicle 10 may employ an on-board electronic control unit 12 ("ECU") (i.e., a controller). Also, the communication system 27 can be configured such that the vehicle 10 includes an on-board transmitter or transceiver 14 (e.g., a Bluetooth transmitter or transceiver 14) and the electronic device 16 includes a receiver or transceiver 29 (e.g., Bluetooth receiver or transceiver 29). The transceivers 14, 29 can communicate with each other.

Figure 4:
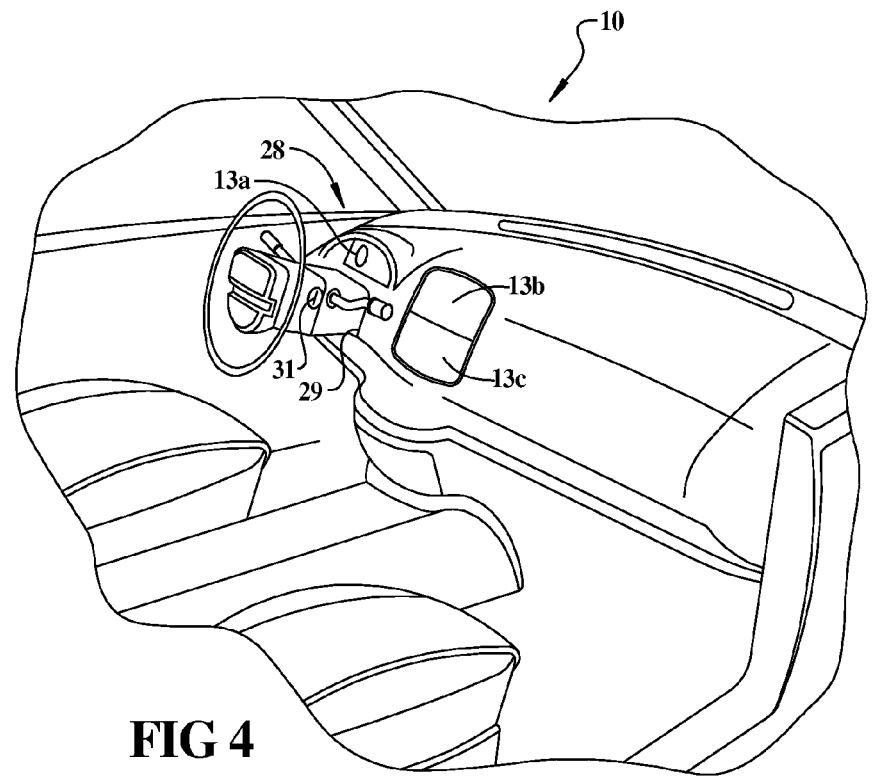
FIG. 4 is a perspective view of a vehicle interior depicting an in-dash navigation system and an instrument cluster with a display that can operate according to the embodiments of the system of FIG. 2.

As shown in FIG. 2, the vehicle 10 can also include the output device 13. Specifically, as shown in FIG. 4, the vehicle 10 can include a plurality of output devices 13a, 13b, 13c. For instance, the output device 13a (e.g., a display screen, a lamp, etc.) can be mounted within an instrument cluster 28 of the vehicle 10, the output device 13b (e.g., speaker, etc.) can be included in the audio system of the vehicle 10, and/or the output device 13c (e.g., display screen, etc.) can be included in the vehicle's navigation system, etc. The output devices 13a, 13b, 13c can provide one or more alarms of the type discussed above with respect to the electronic device 16.

The electronic device 16 can also include an output device, such as an electronic display 21 (e.g., an electronic screen that displays various types of information). The display 21 can output a visual alarm, such as a warning message. However, it will be appreciated that the electronic device 16 can include a speaker (i.e., an audible output device) for outputting a sound or other suitable audible alarm signal. It will also be appreciated that the electronic device 16 can also include a vibratory motor (i.e., a tactile output device) that vibrates or otherwise provides a tactile alarm signal.

As depicted, the electronic device 16 can also include the sensor 15, such as a camera 19 that is mounted to the electronic device 16. The camera 19 can be oriented or positioned within an interior of the vehicle 10 to detect an object 18 outside the vehicle 10. For instance, the camera 19 can be directed to detect the object 18 through a front windshield 17 or windscreen of the vehicle 10. The camera 19 can be operable to detect any suitable object 18. Specifically, the electronic device 16 can include object-recognition software and a processor of a known type such that the camera 19 can be operable to detect an obstacle (e.g., another vehicle, debris, people, a traffic lane marker, a speed limit sign, etc.) on a roadway 20 in front of vehicle 10. Also, in some embodiments, the camera 19 can be oriented to detect objects 18 on the side, behind, below, or above the vehicle 10. The vehicle 10 can be moving with respect to the roadway 20 while the object 18 is detected by the camera 19, and the object 18 may or may not be moving with respect to the roadway 20 while the object 18 is detected by the camera 19. The camera 19 and associated software can be pre-programmed to detect one or more predetermined objects 18.

When electronic device 16 is placed within vehicle 10, such as within a mounting bracket near windshield 17, electronic device 16 wirelessly communicates and links with ECU 12 via a Bluetooth connection between the Bluetooth transceiver 14 and the transceiver 29 of the electronic device 16. Other methods of wireless connection between electronic device 16 and ECU 12 are also possible.

Upon detection of the object 18, the electronic device 16 can transmit a correlating signal to the ECU 12, which can then control the output devices 13a, 13b, 13c (FIG. 4) of the vehicle 10 to output the respective warning signal. Specifically, if the camera 19 detects an obstacle, the devices 13a, 13b, 13c can provide a warning to the driver so that the driver can avoid the obstacle. Likewise, the devices 13a, 13b, 13c can provide warnings if the camera 19 detects that the vehicle 10 is shifting lanes and/or if the speed limit changes. Also, in some embodiments, the display 21 of the electronic device 16 can also output its respective signal for any of these or in any other scenario.

Moreover, the Bluetooth transceiver 14 can also transmit various signals correlating to one or more vehicle parameters to the electronic device 16. Examples of vehicle parameters may include vehicle speed, vehicle acceleration, vehicle deceleration, fuel tank level, oil pressure, coolant temperature, engine performance, weather condition, etc. The electronic device 16 may then read these vehicle parameters into a memory module (not shown) within the electronic device 16. In some embodiments, the electronic device 16 (e.g., a processor within the electronic device 16) can utilize one or more of these parameters in detecting the object 18. For instance, the camera 19 may detect an obstacle, and using the vehicle speed parameter, the electronic device 16 can calculate and estimate how soon the vehicle 10 will impact the object 18 and/or calculate a closing distance between the vehicle 10 and the object 18. Also, in some embodiments, the ECU 12 can perform these calculations. A predetermined threshold closing distance can be established, wherein the output devices 13a, 13b, 13d and/or the display 21 provide the warnings only when the vehicle 10 is within the predetermined closing distance of the detected object 18.

It will be appreciated that the camera 19 can detect the objects 18 in any suitable fashion. Also, in some embodiments, the electronic device 16 can detect objects 18 using radar, laser detection, sonar waves, etc. Other types of wave transmission are conceivable. Moreover, electronic device 16 may communicate with Bluetooth transceiver 14 using electromagnetic waves. That is, electronic device 16 may communicate to Bluetooth transceiver 14 with electromagnetic waves 22 and electronic device 16 may receive electromagnetic waves 24 from Bluetooth transceiver 14. Transceivers utilizing electromagnetic waves other than those within the frequency range of Bluetooth may be used since communication is not limited to the frequency range of Bluetooth.

Using electronic device 16 as an alert device, such as for displaying visual messages or outputting audible and/or tactile alarms can help the user in various ways. For instance, a vehicle driver may be viewing his or her cell phone for various purposes, such as for typing an outgoing message, otherwise known as "texting," or dialing a phone number for an outgoing call. Still yet, a driver may be in a process of receiving an audible call or receiving a text message, both of which may require viewing of the display 21 or otherwise focusing attention primarily on the electronic device 16. While the driver's attention is focused on the electronic device 16, the driver may allow the vehicle 10 to inadvertently drift into another lane, to get within a predetermined distance of an obstacle 18, to enter a zone where the speed limit changes, etc. However, the alarm signal output by the devices 13a, 13b, 13c and/or the display 21 can provide assistance by informing the driver as to these conditions, and the driver can re-focus his or her attention back to driving the vehicle 10.

The system 11 can also help if the vehicle 10 begins to inadvertently shift from the current lane of travel. Lane shifting can be detected by the sensor(s) 15 in various ways. Camera 19 may detect traffic lane markings and the output devices 13a, 13b, 13c and/or the display 21 of the electronic device 16 may provide the alarm when vehicle 10 begins to shift lanes. For instance, the camera 19 can detect the lane departure by detecting that vehicle 10 is nearing a lane boundary marker at a side of a lane or road or in center of roadway 20. In addition to providing the alarm(s), the output device(s) 13a, 13b, 13c, 21 may direct vehicle 10 to a center of a lane within which vehicle 10 is traveling. Continuous lane centering may take place as the camera 19 monitors lane markings, such as roadside lines on roadway 20 or centerlines of roadway 20.

Figure 3:
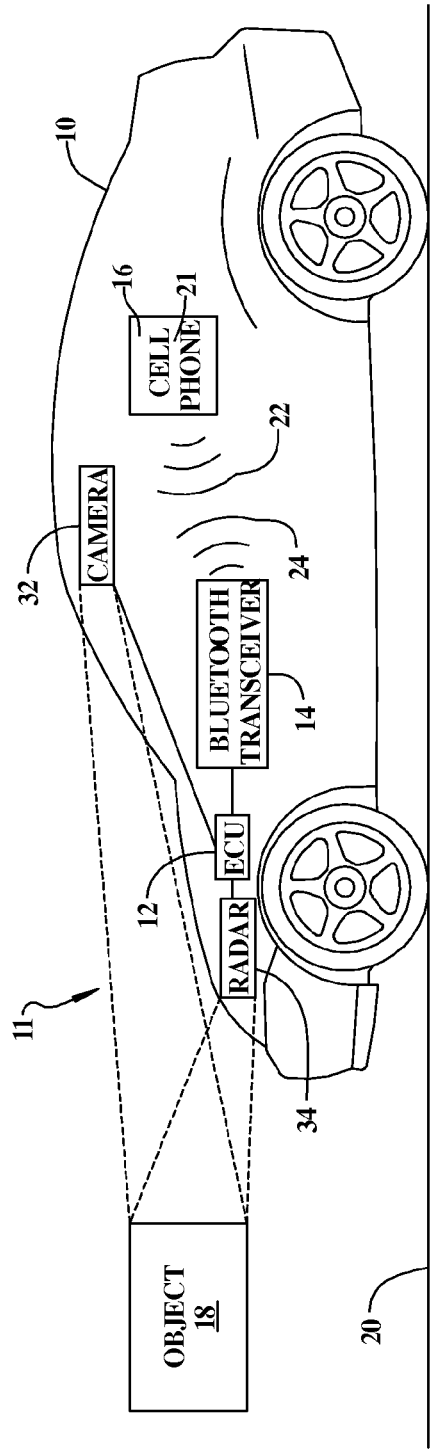
FIG. 3 is a schematic view of a vehicle and a handheld device within the vehicle, the device alerting a driver to conditions outside of the vehicle using the system of FIG. 1.

With reference to FIG. 3, additional embodiments will be discussed. As shown, the sensor 15 described generally with respect to FIG. 1 can be embodied by a vehicle-mounted camera 32, a vehicle-mounted radar device 34, or both. The sensor 15 can also of any other type of vehicle-mounted sensor 15 for detecting objects 18.

Thus, vehicle 10 depicted in FIG. 3 may detect object 18 on a roadway 20 using radar signals emitted from radar device 34. Using a Doppler or similar effect, radar device 34 may emit microwaves or radio waves and receive reflected waves. Regardless of the wave type, waves may be in phase when emitted, and when they come into contact with the object 18, such waves may become scattered. The signal or waves may be partly reflected back and may have a slight change of wavelength and frequency. The radar device 34 may also be a receiver and a transmitter (i.e. a transceiver). The radar device 34 can detect obstacles, lane shifts, speed limit changes, etc. as discussed above.

Moreover, as shown in FIG. 3, the vehicle 10 can include the dedicated, on-board camera 32 to detect the object 18, similar to that of a camera 19 in electronic device 16, as described in FIG. 2. Regardless of whether camera 32 of FIG. 3 or a camera 19 within electronic device 16 of FIG. 2 is used, detection of surrounding traffic (e.g. cars, trucks, buses, bicycles, etc.) is possible in addition to traffic lane markings (e.g. paint, reflective paint, magnetic paint, etc.). The camera 32 can detect obstacles, lane shifts, speed limit changes, etc. as discussed above.

Vehicle parameters can also be transmitted between the electronic device 16 and the vehicle 10 as discussed above. These parameters can include vehicle speed, engine oil pressure, engine coolant temperature, weather conditions, etc.

Similar to the embodiments above, the camera 32 and/or the radar device 34 can detect the object 18 and the condition which triggers the alarm. Then, corresponding signals can be sent to the electronic device 16 such that the display 21 outputs the alarm. The electronic device 16 can output audible and/or tactile alarms as well.

In general, the conditions which trigger the alarms can be differentiated, for instance, as basic warning conditions and optional warning conditions. In some embodiments, the output device(s) 13 of the vehicle 10 and/or the electronic device 16 always provide the alarms for the basic warning conditions; however, the output device(s) 13 optionally provide the alarms for the optional warning conditions.

Basic warning conditions may be those that pertain to safety regulations and major safety concerns. Basic warning conditions may include vehicle collision warnings and lane departure warnings. Optional warning conditions may include convenience warnings and warnings which are not critical for safety. Examples of optional warning conditions can be those in which another vehicle is located within a blind spot of the vehicle 10 and detection of a particular traffic sign (speed limit sign, stop sign, etc.). Other examples of optional warning conditions are also conceivable.

The warnings and alarms provided by the output device(s) 13 can be customizable by a driver or user, such as from electronic device 16 or from within vehicle 10. A user may customize which alarms may be output, and which output device 13 outputs a particular alarm.

An example of a warning scenario may entail the vehicle 10 with a forward collision detection sensor 15 that is approaching a slower moving vehicle in front. The driver of the vehicle 10 may be checking text messages sent to the electronic device 16. The driver checking text messages may not be aware of the reducing distance (i.e., closing distance) between the vehicles. The ECU 12 can perform calculations and determine that the speed of approach is too fast or unsafe and if evasive action is not soon taken, the vehicle 10 will collide with the slower moving vehicle. To determine that the approaching vehicle is approaching a slower moving vehicle to quickly, camera 32 and/or radar device 34 (or camera 19 in electronic device 16) may communicate with ECU 12, which may perform calculations to determine relative speeds of vehicles, necessary braking distances, etc. Upon determining that a collision or non-avoidance is possible, the display 21 can output a warning alarm. Then, the driver can immediately take evasive action, such as with the vehicle steering system or braking system, to avoid a collision.

Another situation involving vehicle 10 pertains to lane departure. More specifically, vehicle 10 may be equipped with a lane departure warning system that continually monitors the position of the vehicle in relation to roadside markings through one or more cameras. If roadway lines on either side of a driving lane are driven over or crossed, the lane departure warning system may provide a warning sound, vibration and voice announcement, such as to electronic device 16, which a driver may be holding. Moreover, an on-board camera (e.g. camera 32, cell phone camera, or other camera(s)) may take an image of the road ahead of the car during the day or within the headlight beams at night. The image may be sent and processed by ECU 12. Roadway markings may constantly be identified and subsequent changes may be recorded with ECU 12. When vehicle 10 ventures, or appears that it will venture, outside the limits of the roadway markings, such as those demarking a lane, the system may alert the driver with an audible alarm or a visible alarm, such as via a display on electronic device 16, or navigation system display 30. Vibration of electronic device 16 may also occur. The lane departure system may take the speed of vehicle 10 into account so that early warnings may be provided when vehicle 10 is traveling at relatively higher speeds. An earlier warning will ensure that the driver has adequate time to correct the steering before any identified roadway markings are crossed. The lane departure warning system may monitor the turn signal's status and issue lane departure warnings only when the driver does not use the vehicle's turn signal in the direction of the lane change. Moreover, the lane departure warning system may monitor traffic lane markings and issue a lane departure warning when vehicle 10 begins to stray from a lane or actually strays from a lane. Straying from a lane may mean a vehicle wheel being a predetermined distance from a lane marking or a wheel actually crossing over a lane marking.

A driver may not be aware of his/her increasing vehicle speed or a change in the speed limit along a roadway because his/her focus may be on the electronic device 16 for texting or other purposes. Vehicle 10 may be equipped with at least one camera 32 or camera within electronic device 16, or side view cameras, to detect speed limits from roadway speed limit signs. Upon detection or reading of a speed limit from a roadside sign by an on-board camera, a signal may be sent to ECU 12 which may communicate with electronic device 16 to display the detected speed limit on a display of electronic device 16. When the driver sees the displayed speed limit which is the actual speed limit, he/she may take action by adjusting vehicle speed to match the speed limit. To the contrary, if no warning or message of the current speed limit is sent to the cell phone, the driver may maintain an excessive speed in a low speed zone, which may be potentially dangerous. Display of the speed limit each time the speed limit changes or is exceeded is an optional feature.

Thus, a method of warning a driver may entail detecting an object in a roadway 20 with an on-board camera, such as a permanently mounted camera 32 in vehicle 10 or a camera 19 resident in a electronic device 16 that is mounted in vehicle 10 and directed at roadway 20. Electronic device 16 may interface with a Bluetooth transceiver 14 to relay or communicate with an ECU 12 that object 18 has been detected in roadway 20. Bluetooth transceiver 14 may then relay from ECU 12 to electronic device 16 an instruction that display 21 of electronic device 16 should display a warning to vehicle 10 driver. Alternatively, an output device 13a, 13b, 13c that is mounted to the vehicle 10 can be used to provide the alarm. A similar method of warning a driver may exist for vehicle 10 that strays or crosses painted lane markers on roadway 20. Still yet, a similar method of warning a driver may exist for warning a driver of a trailing vehicle that gets to close to a leading vehicle. While electronic device 16 and its resident camera 23 have been described as a forward object detection device, relative to a forward traveling direction of vehicle 10, it is also possible that electronic device 16 and its resident camera 23 may be mounted at any position around vehicle 10, such as at a side window of vehicle to monitor a driver blind spot, for example.

The foregoing description of the embodiments has been provided for purposes of illustration and description. It is not intended to be exhaustive or to limit the present disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the present disclosure, and all such modifications are intended to be included within the scope of the present disclosure.

What is claimed is:

1. A system for aiding a user when travelling in a vehicle with a portable and a handheld electronic device, the system comprising:
   a camera separate from the handheld electronic device that detects an object located outside the vehicle and spaced from the vehicle and that detects a condition regarding movement of the vehicle with respect to the object outside the vehicle, the camera supported in the vehicle for travel with the vehicle;
   a communication system that allows the vehicle to communicate a signal to the handheld electronic device, the signal relating to the condition detected by the camera; and
   an output device included on the handheld electronic device, the output device operable to output an alarm based on the signal communicated from the vehicle to the handheld electronic device; wherein
   the object detected by the camera is a speed limit indicator;
   the condition detected by the camera is a change in a speed limit in a zone in which the vehicle is traveling; and
   the alarm outputted by the output device is a notification of the change in the speed limit.

2. The system of claim 1, wherein the output device is at least one of a visual output device that outputs a visual alarm, an audible output device that outputs an audible alarm, and a tactile output device that outputs a tactile alarm.

3. The system of claim 1, wherein the communication system allows for wireless communication of the signal from the vehicle to the electronic device.

4. The system of claim 1, wherein the electronic device is at least one of a cell phone, a personal data assistant ("PDA"), a pager, an electronic tablet, and a wireless-network-connected portable device.

5. The system of claim 1, wherein the communication system further allows a vehicle parameter to be transmitted from the vehicle to the electronic device, the vehicle parameter including at least one of vehicle speed, vehicle acceleration, vehicle deceleration, fuel tank level, oil pressure, coolant temperature, engine performance, and a weather condition.

6. A method of aiding a user when travelling in a vehicle with a portable and a handheld electronic device, the method comprising:
- detecting with a camera separate from the handheld electronic device, an object located outside the vehicle and spaced from the vehicle, and further detecting with the camera, a condition regarding movement of the vehicle with respect to the object outside the vehicle, the camera supported in the vehicle for travel with the vehicle;
- communicating a signal from the vehicle to the electronic device, the signal relating to the condition detected by the camera; and
- outputting an alarm from an output device included on the electronic device, the alarm being based on the signal communicated from the vehicle to the electronic device; wherein
- the detecting of the object includes detecting a speed limit indicator;
- the detecting of the condition includes detecting a change in a speed limit in a zone in which the vehicle is traveling; and
- outputting the alarm includes providing a notification of the change in the speed limit.

7. The method of claim 6, wherein outputting the alarm includes at least one of outputting a visual alarm, outputting an audible alarm, and outputting a tactile alarm.

8. The method of claim 6, wherein communicating the signal includes transmitting the signal wirelessly from the vehicle to the electronic device.

9. The method of claim 6, wherein the electronic device is at least one of a cell phone, a personal data assistant ("PDA"), a pager, an electronic tablet, and a wireless-network-connected portable device.

10. The method of claim 6, further comprising transmitting a vehicle parameter from the vehicle to the electronic device, the vehicle parameter including at least one of vehicle speed, vehicle acceleration, vehicle deceleration, fuel tank level, oil pressure, coolant temperature, engine performance, and a weather condition.

11. A system for notifying a driver of a condition of a vehicle when travelling in the vehicle with a portable, handheld electronic device should the user become distracted by the electronic device, the system comprising:
- a camera separate from the portable, handheld electronic device that detects an object outside the vehicle and that detects a plurality of conditions regarding movement of the vehicle with respect to the object, the camera supported in the vehicle for travel with the vehicle, the plurality of conditions including a lane shift by the vehicle and movement of the vehicle toward an obstacle;
- a communications system that allows the vehicle and the electronic device to wirelessly communicate a signal from the vehicle to the electronic device, the signal relating to the condition detected by the camera; and
- an output device included on the electronic device, the output device operable to output at least one of a visual alarm, an audible alarm, and a tactile alarm based on the signal communicated from the vehicle to the electronic device to thereby alert the driver and cause the driver to refocus attention on driving the vehicle; wherein
- the object detected by the camera is a speed limit indicator;
- at least one of the conditions detected by the camera is a change in a speed limit in a zone in which the vehicle is traveling; and
- the at least one alarm outputted by the output device is a notification of the change in the speed limit.

* * * * *